March 24, 1931.  A. E. L. CHORLTON ET AL  1,798,064
LIGHT WEIGHT RIGID STRUCTURE
Filed Oct. 28, 1929  4 Sheets-Sheet 1
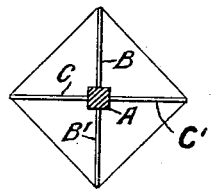
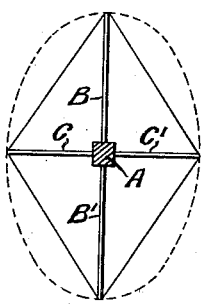
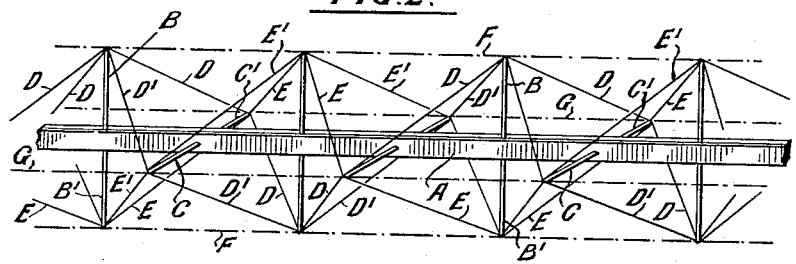
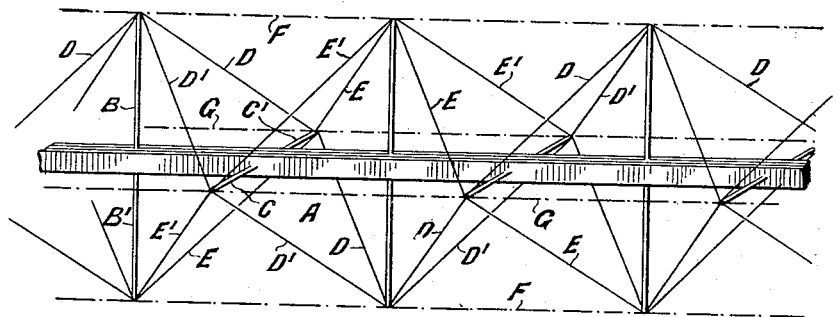
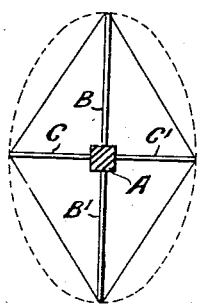
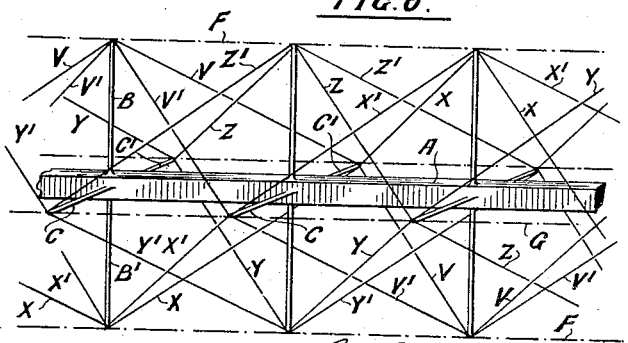

March 24, 1931.  A. E. L. CHORLTON ET AL  1,798,064
LIGHT WEIGHT RIGID STRUCTURE
Filed Oct. 28, 1929  4 Sheets-Sheet 2
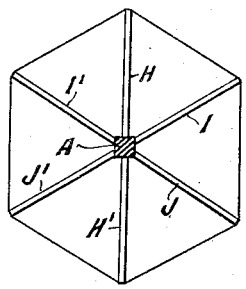
FIG.7.
FIG.8.
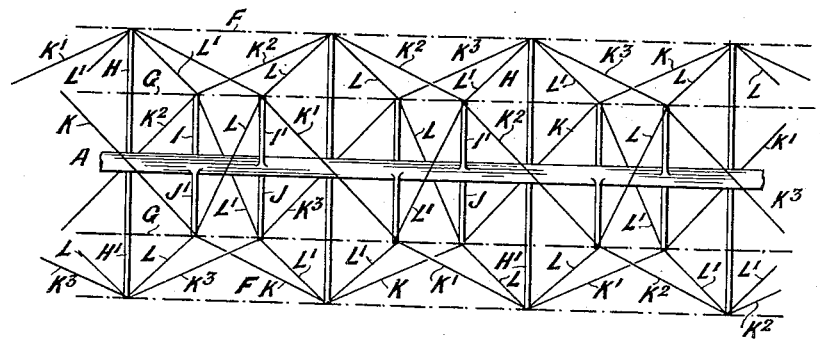
FIG.9.
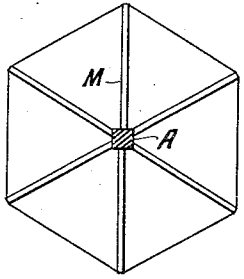
FIG.10.
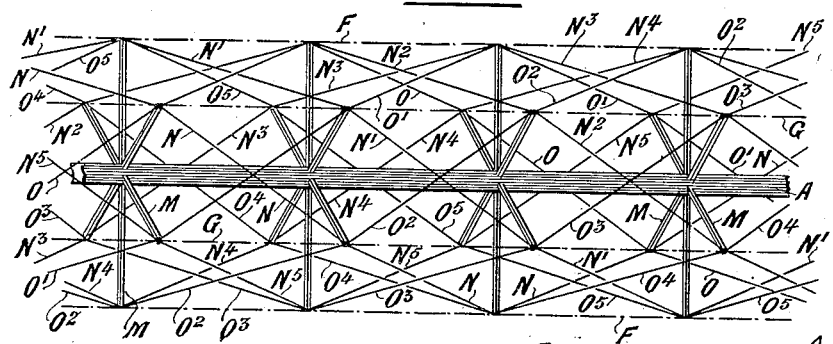

March 24, 1931. A. E. L. CHORLTON ET AL 1,798,064
LIGHT WEIGHT RIGID STRUCTURE
Filed Oct. 28, 1929    4 Sheets-Sheet 3

March 24, 1931. A. E. L. CHORLTON ET AL 1,798,064
LIGHT WEIGHT RIGID STRUCTURE
Filed Oct. 28, 1929 4 Sheets-Sheet 4

Patented Mar. 24, 1931

1,798,064

UNITED STATES PATENT OFFICE

ALAN ERNEST LEOFRIC CHORLTON, ROLLO AMYATT DE HAGA HAIG, AND HELMUT JOHN STIEGER, OF LONDON, ENGLAND

LIGHT-WEIGHT RIGID STRUCTURE

Application filed October 28, 1929, Serial No. 403,034, and in Great Britain December 7, 1928.

This invention relates to light-weight rigid structures such as are employed on aircraft for spars or shafts, and is especially applicable to such structures in which torsional stresses are required to be resisted.

It is well known that structures such as spars which are, for instance, employed as cantilevers in monoplane wings and in fuselages of aircraft, are required to take not only the stresses due to horizontal and vertical bending movements, and combinations of these stresses, but also torsional stresses which tend to twist the wing or fuselage and this has necessitated the employment of a pair of spars of considerable width which, owing to the limitation imposed on aerofoil bodies such as wings and fuselages have been difficult to brace satisfactorily against torsional stresses. It is of course well known that shafts for transmitting power also are subject to torsional stresses and the invention is equally applicable to such shafts.

The object of the present invention is to provide means for bracing a central member such as a spar or shaft against torsional stresses.

A further object is to provide a light-weight rigid structure, capable of resisting torsional stresses as well as horizontal and vertical bending movements, which will be of minimum weight.

Further objects will appear from the following description.

In order to elucidate the novel features of this invention, it would be explained that if a number of equal radii extending outwardly from a common axis are progressively spaced at intervals both along the axis and in a revolving direction about this axis, the outer ends of the radii define a helicoidal curve, the larger the number of radii the closer does the curve approach a true helix, while with a lesser number of radii the curve loses its true helical form. For practical purposes, in the present invention only a small number of radii are employed, but for purposes of definition the curve formed by joining the outer ends of such radii will be hereinafter referred to as helical.

According to the present invention a single central rigid member is combined with radiating members extending therefrom and opposed systems of helical tension bracings connecting the ends of said radiating members and wound around the single central rigid member.

Referring to the drawings,

Fig. 1 is a cross-sectional view of a spar having the helical bracings and spokes applied to a single boom.

Fig. 2 is an isometric perspective view of the same spar as is shown in Fig. 1.

Figs. 3 and 4 illustrate a similar form of spar to that shown in Figs. 1 and 2 but that the vertical spokes are longer than the horizontal spokes so that the section of the fuselage may be elliptical with the major axis vertical.

Figs. 5 and 6 are similar views to Figs. 3 and 4, but illustrate a spar in which the spokes are arranged in cross-like fashion intersecting each other where they intersect the boom.

Fig. 7 is a cross-sectional view of a spar having the spokes arranged in angular steps more frequent and with less angular change than in the preceding figures.

Fig. 8 is a side view of the spar shown in Fig. 7.

Figs. 9 and 10 illustrate a similar form of spar to that shown in Figs. 7 and 8 but with the spokes arranged in cross-like fashion intersecting each other where they intersect the boom; Fig. 10, being an isometric perspective view.

Figure 11:
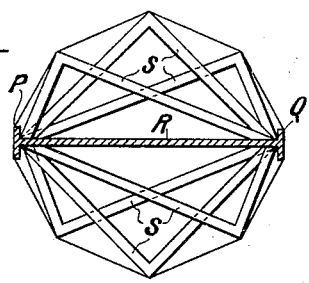
Fig. 11 is a cross-sectional view of a two-boom spar showing how the invention is applied thereto.

The spar illustrated in Figs. 1 and 2 comprises a single boom A with radially extending spokes B $B^1$, C $C^1$ arranged at intervals along the length of the boom. The spokes B $B^1$ form one series and the spokes C $C^1$ form another series; and, as shown, the spokes C $C^1$ alternate with the spokes B $B^1$. The spokes C $C^1$ also project at right angles to the spokes B $B^1$. These spokes are connected by tension bracings of which there are four marked D $D^1$, E $E^1$. The wire D constituting one tension bracing passes from the end of the left-hand upstanding spoke B in Fig. 2 rearwardly of the boom to the end of the rearwardly extending adjacent spoke $C^1$ and from the end of this spoke this wire passes downwardly and forwardly to the end of the next downwardly extending spoke $B^1$. From the end of the downwardly extending spoke $B^1$ the wire D passes forwardly and upwardly to the end of the next forwardly extending spoke C and, finally, from the end of the forwardly projecting spoke C the wire D passes to the end of the next upwardly extending spoke B. Thus the wire D is wound around the boom A in helical convolutions. The wire E, constituting another tension bracing, passes from the downwardly extending spoke $B^1$ at the left-hand side of Fig. 2, rearwardly and upwardly to the end of the rearwardly extending spoke $C^1$ and from the end of this spoke $C^1$ this wire E extends upwardly and forwardly to the top of the upstanding spoke B. This wire E then passes from the top of this spoke B forwardly and downwardly to the end of the next forwardly extending spoke C and, lastly, from the end of this forwardly extending spoke C this wire E passes to the end of the next downwardly extending spoke $B^1$. Thus the bracing E is wound around the boom A in an opposite helical convolution to that of the wire D. The wires D and E therefore constitute helical bracings of regular formation arranged in left and right-hand windings around the boom and cross one another at the ends of the spokes. Two sets of such helical bracings are shown the one set which has been described, consisting of the wires D and E, and the other set consisting of the complementary arranged wires $D^1$ $E^1$. It will be understood that although only a section of the bracing has been described this is repeated throughout the length of the spar. Similar tension bracings being indicated by similar reference letters in the drawings. Longitudinal wires F connect the ends of the spokes B and similar longitudinal wires G connect the ends of the spokes C together; the wires F and G being provided on opposite sides of the spar.

The arrangement illustrated in Figs. 3 and 4 is similar to that described with reference to Figs. 1 and 2 except that the spokes B and $B^1$ are longer than the spokes C $C^1$, so that the sections of the fuselage constructed on the spar may be elliptical, with the major axis vertical, as indicated by dotted lines in Fig. 3.

In Figs. 5 and 6 a single boom A is provided with two series of spokes B $B^1$ and C $C^1$ as in Figs. 3 and 4, but instead of arranging the spokes of one series alternating with the spokes of the other series, these spokes are arranged in the same plane and in cross-like fashion, intersecting each other where they intersect the boom. In this case, however, four pairs of opposed bracing wires are provided, instead of two pairs as in the previously described constructions, these wires being marked V, $V^1$; X, $X^1$; Y, $Y^1$ and Z, $Z^1$.

Figs. 7 and 8 illustrate an arrangement in which the spokes H, I, J, $H^1$, $I^1$, $J^1$ are arranged in angular steps at about 60° apart. In this case six tension bracings marked K, $K^1$, $K^2$, $K^3$ and L, $L^1$ are provided wires K, $K^1$, $K^2$, $K^3$ forming helical convolutions and the wires L, $L^1$ forming opposite helical convolutions around the spar A; the two sets of wires K, $K^1$, $K^2$, $K^3$ and L, $L^1$ constitute two opposed bracings intersecting with each other at the ends of the spokes H, I, J, $H^1$, $I^1$, $J^1$.

Figs. 9 and 10 illustrate an arrangement such as is described and illustrated in Figs. 7 and 8, but in which the spokes M are all located in the same plane and intersect one another where they intersect the boom A. In this case twelve tension bracings marked N, $N^1$, $N^2$, $N^3$, $N^4$, $N^5$ and O, $O^1$, $O^2$, $O^3$, $O^4$, $O^5$ are provided, those lettered N constituting one set forming helical convolutions around the spar and those lettered O constituting another set forming opposite convolutions around the spar, and these two sets of wires form two opposed bracings intersecting each other at the ends of the spokes M.

Figure 12:
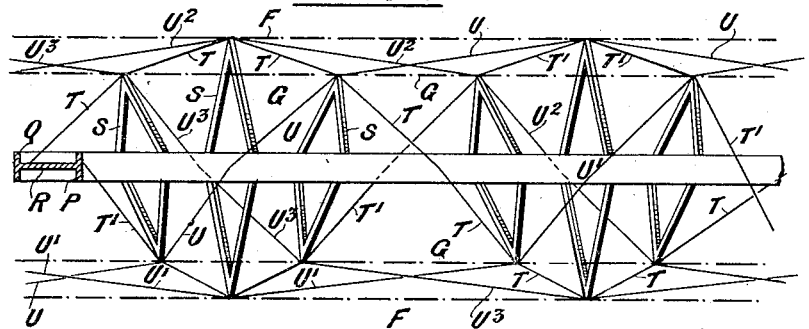
Fig. 12 is an isometric perspective side view of the spar shown in Fig. 11.
Figure 13:
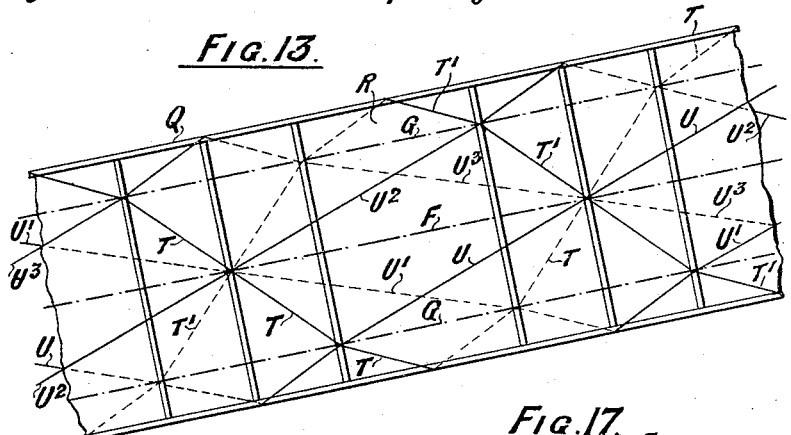
Fig. 13 is a plan view of the spar shown in Figs. 11 and 12.

In Figs. 11, 12 and 13 the application of the invention to a two-boom spar is illustrated. In this case the booms P and Q are connected by a web R. The struts S are of triangular form with the base of the triangle constituted by the web R of the spar. The triangles are of different angular dimensions and of different form with the apices arranged on a circle having a diameter composed by the web, as is shown in Fig. 11. These triangular struts are also located in spaced relationship along the length of the spar as shown in Figs. 12 and 13 so that the apices of the triangles follow a helical curve. In this case six tension bracings are provided marked T, $T^1$ and U, $U^1$, $U^2$, $U^3$, those lettered T, $T^1$ constitute one set forming helical convolutions about the spar, and those lettered U, $U^1$, $U^2$, $U^3$ constitute another set forming opposite convolutions around the spar, the two sets together forming opposed bracings intersecting each other at the ends of the struts S.

Figure 14:
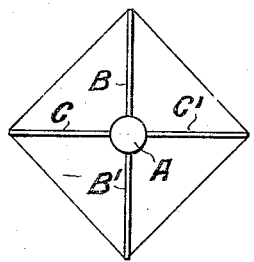
Fig. 14 is a cross-sectional view of a shaft having the helical bracings and spokes applied thereto.
Figure 15:
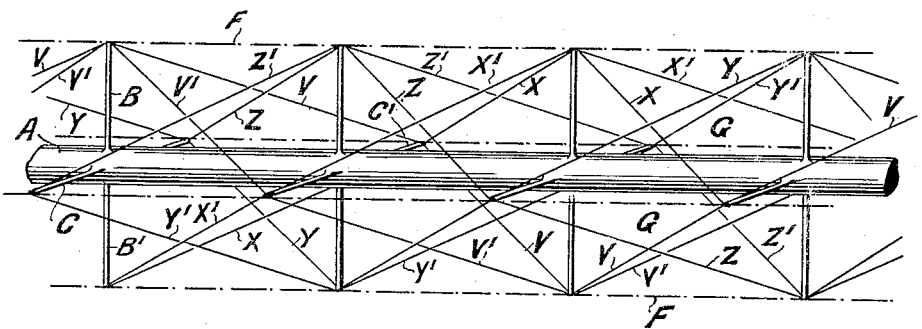
Fig. 15 is an isometric perspective view of the shaft shown in Fig. 14.

Figs. 14 and 15 show a similar arrangement of radiating members in the form of spokes to that shown in Figs. 5 and 6 as applied to a spar, but in this case, owing to its application to shafts, the spokes are made of equal length. The parts in these figures are represented by the same reference numerals as employed in Figs. 5 and 6.

Figure 16:
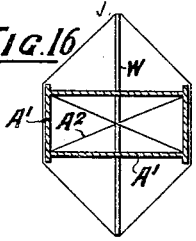
Fig. 16 is a cross-sectional view illustrating the application of the invention to a box spar.
Figure 17:
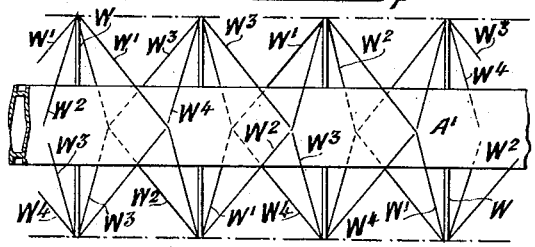
Fig. 17 is an isometric perspective view of the spar shown in Fig. 16.

The invention may also be applied to a box spar structure as shown in Figs. 16 and 17. In this case the box spar $A^1$, which may be internally braced, as shown, by the bracings $A^2$, or otherwise provided with or without bracings, has a strut W extending from opposite sides thereof and has opposed systems of helical tension bracings marked $W^1$, $W^2$ and $W^3$, $W^4$.

In all cases the longitudinal bracing wires F and G will be provided for connecting the ends of the spokes.

Although the tension members have been referred to in the specification as wires, it is obvious that other connecting members may be used in place of the wires. It will also be recognized that the tension members nearest the point at which the spar is supported will be required to support greater stress than the wires comprising tension members in the parts remote from the said support. The thickness of the wires can therefore be chosen in accordance with the distance of any particular part from the point of support; larger gauge wires or other connecting members being used near the support and smaller gauge wires being used remote from the support.

It will be understood that the invention thus developed is applicable to any form of spar, by providing such spar with outstanding spokes or struts which permit the ends of the spokes or struts being connected together by bracings in helical form such bracings being in opposite directions.

Shafts for transmitting power may be built in very light form by means of this invention and are thus very suitable for use on airships and other aircraft.

What we claim as our invention and desire to secure by Letters Pattent is:—

1. A spar having two booms separated by a web, triangular struts with legs standing against the booms and the longest side comprising the web, and opposed systems of helical tension bracings connecting the apices of said triangular struts.

2. A spar having two booms separated by a web, triangular struts with legs standing against the booms and the longest side comprising the web, said struts being spaced apart along the length of the booms and having their apices arranged to follow a curve composed by the web and regularly arranged in angularity from the centre of the web.

3. The combination with a single central rigid member of series of radiating members extending outwardly on opposite sides of the rigid member, with the said radiating members arranged at more than two different angular positions, opposed systems of helical tension bracings connecting the ends of said radiating members, said bracings crossing each other at said ends and wound in opposite directions around the single central rigid member, and bracings connecting the ends of said radiating members to each other in a longitudinal direction.

4. The combination with a single central rigid member of series of radiating members extending outwardly on opposite sides of the rigid member and in different angular positions, intersecting each other at the axis of said rigid member, opposed systems of helical tension bracings connecting the ends of said radiating members, said bracings crossing each other at said ends and wound in opposite directions around the single central rigid member, and bracings connecting the ends of said radiating members to each other in a longitudinal direction.

5. The combination with a single central rigid member of series of radiating members extending outwardly on opposite sides of the rigid member, with the said radiating members arranged at different angular positions, opposed systems of helical tension bracings, connecting the ends of said radiating members, said bracings crossing each other at said ends and wound in opposite directions around the single central rigid member, and bracings connecting the ends of said radiating members to each other in a longitudinal direction.

In witness whereof we have hereunto set our hands.

ALAN ERNEST LEOFRIC CHORLTON.
ROLLO AMYATT de HAGA HAIG.
HELMUT JOHN STIEGER.